Jan. 7, 1936. C. VOGT 2,027,254
SCOOTER
Filed Oct. 12, 1934 2 Sheets-Sheet 1
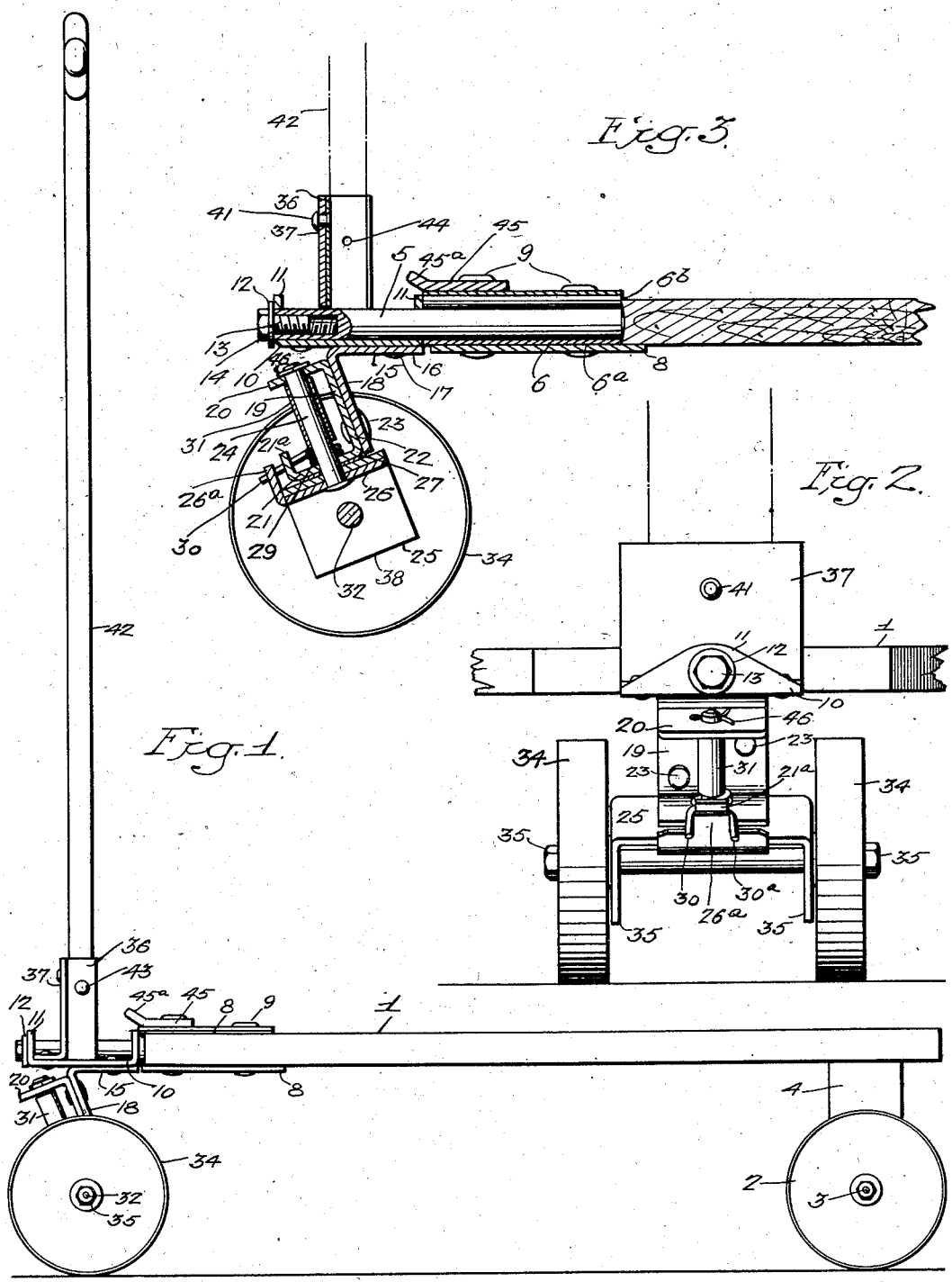
Inventor
Clarence Vogt,
by his Attorneys
Howson & Howson Jan. 7, 1936.                C. VOGT                2,027,254
                              SCOOTER
                   Filed Oct. 12, 1934        2 Sheets-Sheet 2
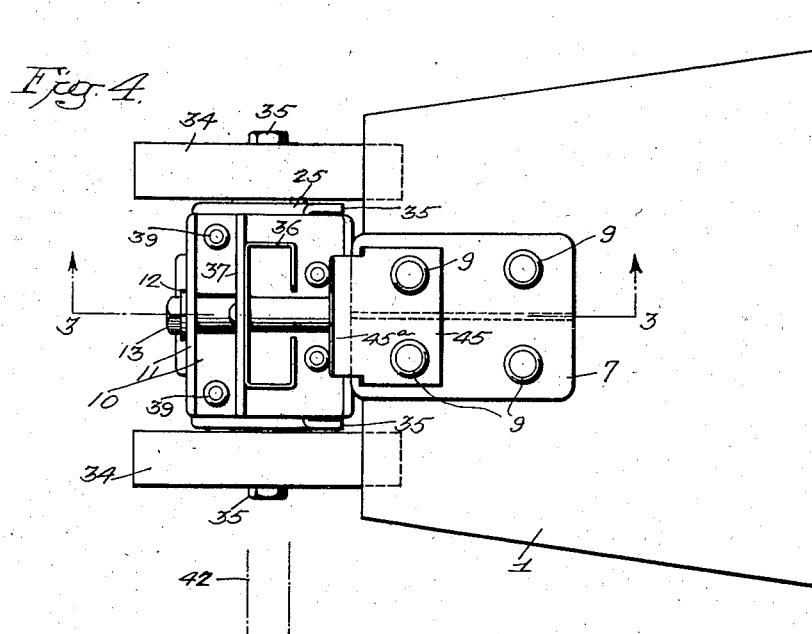
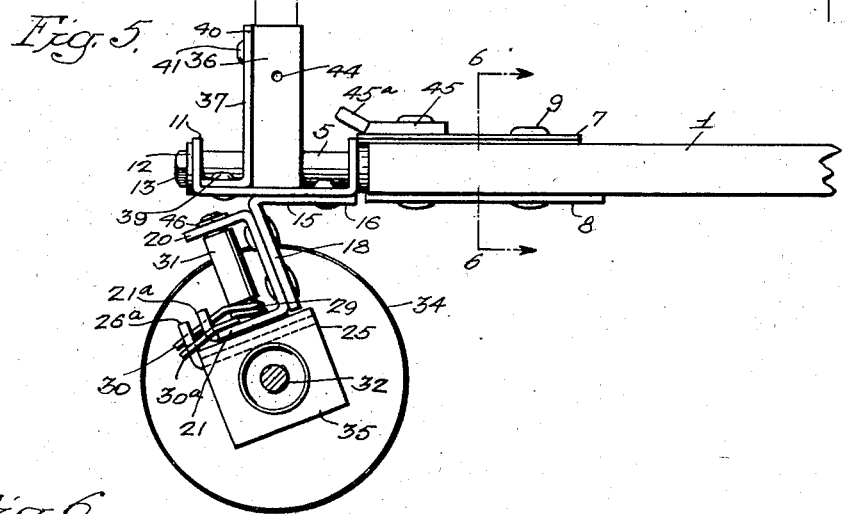
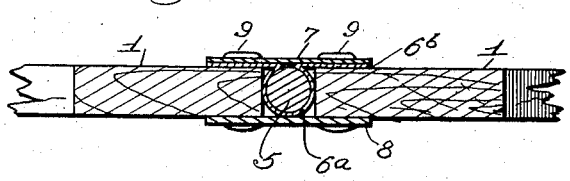
Inventor:
Clarence Vogt
by his Attorneys.

Patented Jan. 7, 1936

2,027,254

UNITED STATES PATENT OFFICE 2,027,254

SCOOTER

Clarence Vogt, Wenonah, N. J.

Application October 12, 1934, Serial No. 748,116

11 Claims. (Cl. 280—87.5)

This invention relates to new and useful improvements in scooters, and has particular relation to the steering mechanism thereof.

The principal object of the invention is to provide a scooter as set forth having certain novel features of construction to permit the person riding thereon to effectively steer the same.

Another object of the invention is to provide a scooter as set forth having a novelly constructed steering mechanism permitting pivoting of the front or forward rollers or wheels thereof with respect to the scooter.

Another object of the invention is to provide a scooter of the character set forth having a novelly constructed steering mechanism including a double bearing for the spindle or pin of the front roller assembly.

Another object of the invention is to provide a scooter of the character set forth having a novelly constructed steering mechanism pivotally mounted axially of the scooter.

Other features and details of the invention and the construction thereof are set forth hereinafter and disclosed in the accompanying drawings thereof, in which:

Fig. 1 is a view in side elevation of a scooter constructed according to the present invention.

Fig. 2 is an enlarged fragmentary end view from the front of the scooter showing the novel steering mechanism.

Fig. 3 is a view in section on line 3—3, Fig. 4.

Fig. 4 is a view in plan of the disclosure shown in Fig. 2.

Fig. 5 is a view in side elevation of the disclosure in Fig. 4; and

Fig. 6 is a view in section on line 6—6, Fig. 5.

Referring now more particularly to the drawings, a scooter made in accordance with the present invention comprises a platform or foot rest 1, which may be of any desired configuration but which is shown in the accompanying drawings as being relatively narrow at the front or forward end thereof and having its sides diverging rearwardly so that the rear end of said foot rest is of greater width than the forward or steering end thereof.

The rear end of the foot rest 1 is supported upon rollers or wheels 2 mounted upon an axle 3 which is in turn supported by a bracket 4 permanently secured transversely of said foot rest 1 to the underside thereof.

The particular feature of the invention concerns the novelly constructed steering mechanism which is mounted at the opposite or forward end of the foot rest 1 and includes a spindle 5 mounted co-axially with respect to the longitudinal axis of said foot rest in a bracket 6 formed to include a substantially circular sleeve portion 6a arranged to embrace said spindle 5 and support the same, and the parallel portions 6b of the bracket 6 overlie the adjacent upper surface portions of the foot rest 1. Top and bottom cover plates 7 and 8 are provided and together with the bracket 6 are secured together and to the foot rest by means of rivets 9 which extend therethrough. In the present instance spindle 5 is of sufficient length so that the same will project a substantial distance beyond the forward end of the foot rest.

A bracket 10 having vertical flanges 11 at the ends thereof provided with aligned openings is rotatably mounted upon the forward end of the spindle 5 intermediate the front end face of the foot rest 1 and a washer 12 which is secured in place by means of a bolt 13 threaded internally at the outer end of said spindle as at 14.

One leg 15 of an angle plate 16 is permanently secured to the under side of the bracket 10 adjacent the foot rest end thereof by means of rivets or bolts 17. The other leg 18 of the angle element 16 forms an acute angle with the previously mentioned leg 15 and is disposed at a forwardly inclined angle with respect to the said foot rest.

A bracket 19 including upper and lower parallel arms 20 and 21 have their connecting web 22 secured to the forward face of the leg 18 of the angle 16 by any suitable means such as rivets or bolts 23. The arms 20 and 21 are provided with aligned apertures and constitute bearings for a spindle 24 which is rotatably mounted therein. The forward portion of the lower web 21 of the bracket 19 is upturned as at 21a to form a tongue, the purpose for which will be set forth in detail hereinafter. An axle supporting bracket 25 and a plate 26 are rigidly connected to the lower end of the spindle 24 for rotation therewith in the bracket 19. A washer 27 is interposed between the lower arm 21 of the bracket 19 and the axle supporting bracket 25, and the spindle is retained in operative relation with respect to said bracket 25 by means of a cotter pin 46. In the present instance the forward portion of the plate 26 is bent upwardly as at 26a to form a tongue similar to that formed at 21a.

As shown in the drawings, a spring 29 is coiled several times about the spindle 24 intermediate the arms 20 and 21 of the bracket 19, the ends 30 and 30a of said spring 29 extending forwardly from said spindle 24 and engaging opposite end edges of the tongues 21a and 26a respectively for the purpose of resisting rotation of the spindle 24 and axle bracket 25. A sleeve 31 is positioned on the spindle 24 intermediate the spring 29 and the upper arm 20 of the bracket 19 for the purpose of maintaining said spring 29 adjacent the lower arm 21 of said bracket 19. An axle 32 is mounted in apertures formed in the depending legs 33 of the axle supporting bracket 25 and wheels or rollers 34 are mounted at each end thereof, and retained thereon by means of nuts 35.

A support 36 of preferably rectangular shape extends vertically from the upper surface of the pivotally mounted bracket 10 and is secured thereto by means of an angle bracket 37, one leg 38 of which is permanently secured to the said bracket 10 by rivets 39 and the other or vertical leg 40 thereof is permanently secured to the forward wall of the support 36 by rivets or bolts 41. In the present instance a handle or steering lever 42 is secured in the support 36 by a bolt or other suitable means 43 which extends through an aperture 44 in said support and engages the said steering lever 42.

In accordance with the present invention by pivotally mounting the bracket 10 on the spindle 5 and arranging the bracket 19 at an angle with respect to the plane of the foot rest 1, the instant a person riding on the scooter actuates the lever 42 to the right or left in an arc transversely of the longitudinal axis of the scooter, this pivoting the bracket 10 on spindle 5, the spindle 24 will be pivoted in its bracket 18 and the axle 32 and wheels 34 will be disposed at an angle with respect to the transverse position in which they are normally maintained by means of the spring 29, the axle 32 and wheels 34 remaining in the turned position only so long as the lever 42 is held in a position to the right or left with respect to the longitudinal axis of the scooter, and when said lever is returned partially or all the way to its neutral or central position, the spring 29 will function to return the axle 32 and wheels 34 to their normal transverse position, or positions corresponding to the degree of displacement laterally of the lever 42 respectively.

For the purpose of limiting the extent of pivot of the bracket 10 about the spindle 5 it is desirable to mount a stop plate 45 on the upper surface of the foot rest 1 at its forward end, the plate 45 having a projecting portion 45a which lies in the path of rotation of the bracket 10 for engagement thereby.

While one embodiment of the invention has been set forth for the purpose of description it is not intended that the same be principally limited thereto but that modifications and changes may be made in the construction thereof where within the scope of the appended claims.

What I claim is:

1. In a scooter including a foot rest, a bearing pivotally mounted at the forward end of said foot rest and disposed at a rearwardly inclined angle with respect thereto, a spindle rotatably mounted in said bearing, an axle-supporting bracket connected to said spindle and arranged for rotation therewith, and means embracing the spindle and engaging the bearing and said bracket tending to resist rotation of the latter and the spindle.

2. In a scooter including a foot rest, spaced parallel bearings pivotally mounted at the forward end of said foot rest and disposed at a rearwardly inclined angle with respect thereto, a spindle rotatably mounted in said bearings, an axle supporting bracket mounted on said spindle for rotation therewith, and means on said spindle engaging one of said bearings tending to resist rotation of the spindle.

3. In a scooter including a foot rest, spaced parallel bearings pivotally mounted at the forward end of said foot rest and disposed at a rearwardly inclined angle with respect thereto, a spindle rotatably mounted in said bearings, an axle supporting bracket mounted on said spindle for rotation therewith, and means embracing the spindle and engaging one of the bearings and said bracket to resist rotation of the latter and the spindle.

4. In a scooter including a foot rest, a spindle mounted longitudinally of said foot rest and extending beyond the front end thereof, a bearing pivotally supported from said spindle and disposed at a rearwardly inclined angle with respect to the foot rest, a second spindle rotatably mounted in said bearing, an axle supporting bracket mounted on said spindle for rotation therewith, and means associated with the second spindle and engaging said axle-supporting bracket tending to resist rotation thereof and said spindle.

5. In a scooter including a foot rest, a spindle mounted longitudinally of said foot rest and extending beyond the front end thereof, a bracket rotatably mounted on said spindle, a bearing supported from said bracket, a second spindle rotatably mounted in said bearing, an axle supporting bracket mounted on said spindle for rotation therewith, and means for pivoting the first mentioned bracket.

6. In a scooter including a foot rest, a spindle mounted longitudinally of said foot rest and extending beyond the front end thereof, a bracket rotatably mounted on said spindle, a bearing supported from said bracket, a second spindle rotatably mounted in said bearing, an axle supporting bracket mounted on said spindle for rotation therewith, and means associated with said foot rest for engagement by the first mentioned bracket, to resist rotation thereof.

7. In a scooter including a foot rest, a spindle mounted longitudinally of said foot rest and extending beyond the front end thereof, a bracket rotatably mounted on said spindle, spaced parallel bearings supported from said bracket and disposed at a rearwardly inclined angle with respect to the foot rest, a second spindle rotatably mounted in said bearings, an axle supporting bracket mounted on said spindle for rotation therewith, and means associated with the second spindle engaging one of said bearings and the first mentioned bracket tending to resist rotation of the latter and said spindle.

8. In a scooter including a foot rest, a spindle mounted longitudinally of said foot rest and extending beyond the front end thereof, a bracket rotatably mounted on said spindle, spaced parallel bearings supported from said bracket and disposed at a rearwardly inclined angle with respect to the foot rest, a second spindle rotatably mounted in said bearings, an axle-supporting bracket mounted on said spindle for rotation therewith, means associated with the second spindle and engaging the axle-supporting bracket tending to resist rotation thereof, and said spindle and means associated with the foot rest limiting rotation of the first mentioned bracket.

9. In a scooter including a foot rest, a spindle mounted longitudinally of said foot rest and extending beyond the front end thereof, a bracket rotatably mounted on said spindle, spaced parallel bearings supported from said bracket and disposed at a rearwardly inclined angle with respect to the foot rest, a second spindle rotatably mounted in said bearings, an axle supporting bracket mounted on said spindle for rotation therewith, means associated with the second spindle tending to resist rotation thereof, means associated with the foot rest limiting rotation of the first mentioned bracket, and means for pivoting said first mentioned bracket.

10. In a scooter including a foot rest, a spindle mounted longitudinally of said foot rest and extending beyond the front end thereof, a bracket rotatably mounted on said spindle, spaced parallel bearings supported from said bracket, a second spindle rotatably mounted in said bearings, an axle-supporting bracket mounted on said spindle for rotation therewith, means associated with the second spindle and engaging the axle supporting bracket tending to resist rotation thereof, and means associated with the foot rest limiting rotation of the first mentioned bracket.

11. In a scooter including a foot rest, a spindle mounted longitudinally of said foot rest and extending beyond the front end thereof, a bracket rotatably mounted on said spindle, spaced parallel bearings supported from said bracket, a second spindle rotatably mounted in said bearings, an axle supporting bracket mounted on said spindle for rotation therewith, means associated with the second spindle tending to resist rotation thereof, means associated with the foot rest limiting rotation of the first mentioned bracket, and means for pivoting said first mentioned bracket.

CLARENCE VOGT.